April 5, 1955     S. J. STEENSEN     2,705,394
SELF-CLEANING RAKE
Filed July 31, 1952
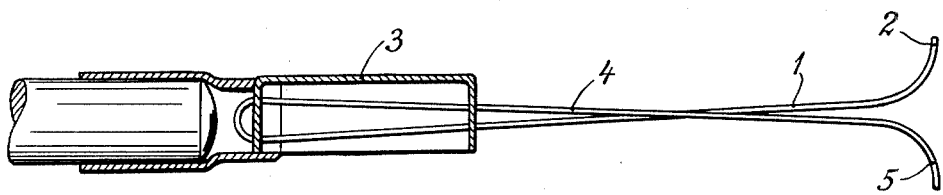
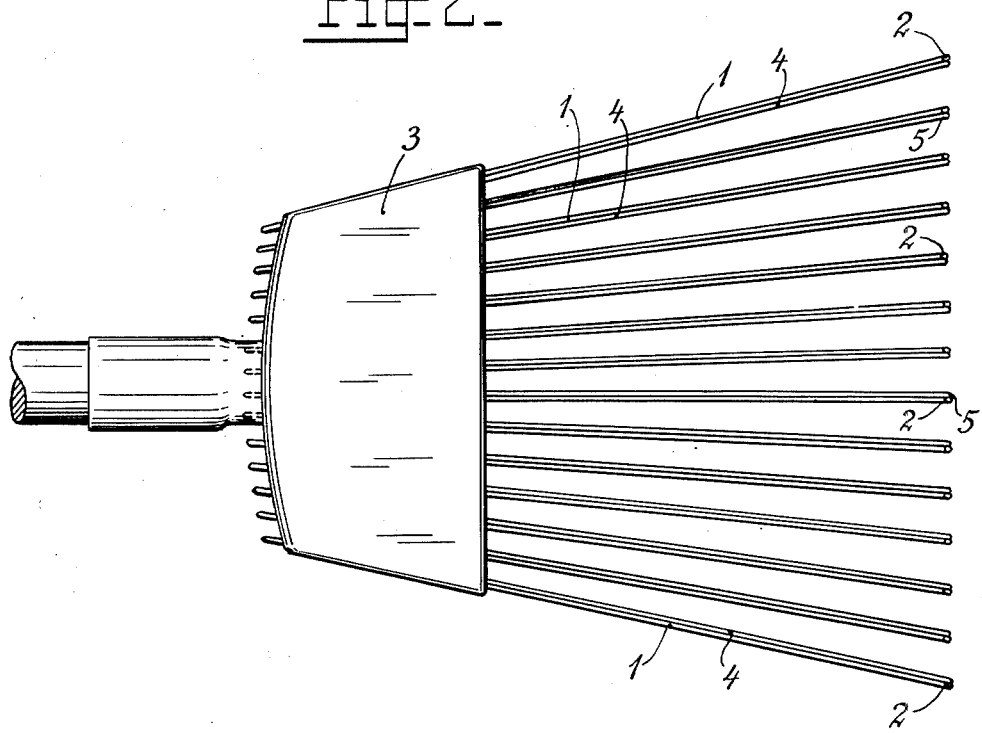

2,705,394

SELF-CLEANING RAKE

Sverre Johan Steensen, Ulleval Hageby, Oslo, Norway

Application July 31, 1952, Serial No. 301,853

2 Claims. (Cl. 56—400.17)

This invention relates to a garden rake of the kind which is usually termed leaf rake and which is used mostly to rake leaves, twigs and grass. It is usually provided with teeth of steel (spring steel) which are located in the longitudinal direction of the handle and bent approximately in a right angle to the uttermost end, so that they will yield away owing to a greater resistance in order not to injure flowers, roots and the like. The rake is also used for raking hay.

It is formerly known that in raking leaves, twigs and mud such twigs would easily remain between the teeth. Leaves are spit rapidly by the teeth, and after a short time the rake is so charged that the teeth must be cleaned. This is made with the fingers and can, when a frequent cleaning is necessary, take a proportionally long time as compared with the effective rake time and besides it is a disagreeable work.

By the present invention this inconvenience is avoided and the rake is nearly self-cleaning. It is not more expensive to produce than the rakes now in use and one obtains in addition two sets of teeth.

These two sets of teeth may be easier to produce and attach than one of the teeth on the rakes now used, because there are uniform sharp bendings.

The invention is distinguished substantially by the tooth points being bent alternately out to opposite sides, so that a double-side rake is obtained, preferably in such a manner that any two adjacent teeth consist of an integral piece of wire or the like. The wire might be passed from one tooth point backwards in a loop back into the attaching member for the wires and then side by side of the first tooth forwards through the attaching member to the other tooth point, which is bent out in opposite direction. Preferably the teeth in each pair are located tightly together and are crossing each other, so that during the raking they can slide upon another in a direction perpendicularly to the plane through the tooth row.

An embodiment is shown in the drawing. Fig. 1 is a side view and Fig. 2 a plan view of the rake.

As it will be seen the rake is made in the manner that the wire for the tooth 1 bent out at 2 is passed backwards towards the ordinary attaching member 3, which holds the wire in position, then forwards again in order to form the other tooth 4, the end portion 5 of which is, however, bent out to the opposite side, so that two teeth 1, 4 crossing each other are obtained and have their end portions 2, 5 facing in opposite directions. When all teeth are in position, the rake has one set of teeth directed downwards and another set of teeth directed upwards, consequently a sort of "twin rake."

If now leaves, twigs and the like which have been picked up, remain on the teeth 5 by which one has raked for some time, it will suffice only to turn around the rake and begin to rake with the other tooth row 2. Accordingly, as the latter is pressed down into leaves and twigs, it will itself press out such matters which has attached to the opposite row of teeth 5. Of course, it is possible at once to remove all such matter simultaneously by pressing the side of the rake which is now to be used, up into the row of teeth upon which the leaves have attached. This is made simply by pressing the rake by means of the handle against the earth two or three times, so that the teeth which are bent springingly, are pressed out and in between the teeth in the opposite tooth row and thereby remove the leaves on the same. In order that this might be obtained efficiently, one tooth row is preferably under spring action in the lateral direction against the other one 4, so that the teeth are sliding in contact with each other. The teeth are therefore arranged in such manner that they cross each other at a great distance from the tooth points nearer to the attaching plate 3, so that they are sliding upon each other under spring action. Thereby the leaves which are impaled by one tooth, are attached very close to this plate.

If there is any leaf also upon the tooth row which is used for the moment, such leaves are pressed down against the earth, whereas those which have been impaled upon the other tooth row, are pressed up into the air away from the teeth from this tooth row, when the other row has been fully charged after some time. The rake is then again turned around. Of course, the system may with suitable dimensions be utilized also in connection with ordinary rakes in order to remove earth lumps, peat etc., which usually attach to rakes with teeth of wood.

I claim:

1. A rake comprising a first row of long, freely projecting resilient teeth having points curved out to one side approximately at a right angle relatively to a plane through the said tooth row, and a second row of similar teeth located between those of the first-mentioned row and having points curved out to the opposite side in such a manner that each tooth of the first row is in sliding engagement with an adjacent tooth of the second row, so that the teeth during the raking are in tight sliding engagement against at least one adjacent tooth crosswise to the said plane, for the purpose of effecting an efficient safe self-cleaning of the rake.

2. A rake comprising a first row of elongated, freely projecting resilient teeth each having a point curved out to one side approximately at a right angle relatively to a central plane through the said tooth row, and a second row of similar teeth located between those of the first-mentioned row and having points curved out to the opposite side in such a manner that each tooth of the first row is in laterally springing and sliding engagement with an adjacent tooth of the second row, so that the teeth during the raking are in tight sliding engagement against at least one adjacent tooth crosswise of the said plane, for the purpose of effecting an efficient safe self-cleaning of the rake.

References Cited in the file of this patent

UNITED STATES PATENTS

| 2,236,129 | Baker | Mar. 25, 1941 |

FOREIGN PATENTS

| 26,607 | Germany | Apr. 12, 1884 |